P. FICHTER.
CLUTCH.
APPLICATION FILED JUNE 19, 1916.
1,215,513. Patented Feb. 13, 1917.
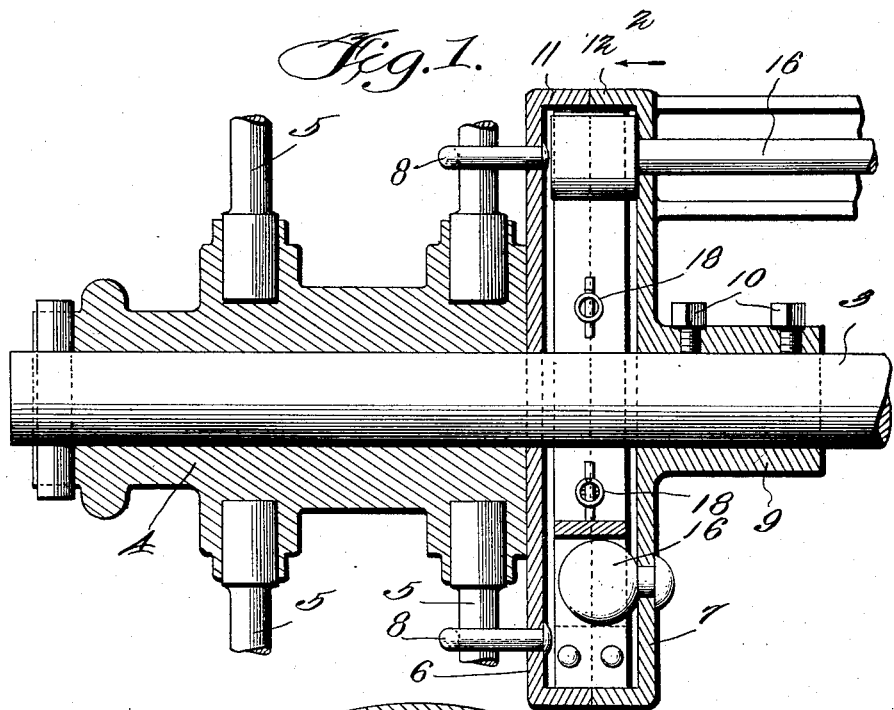
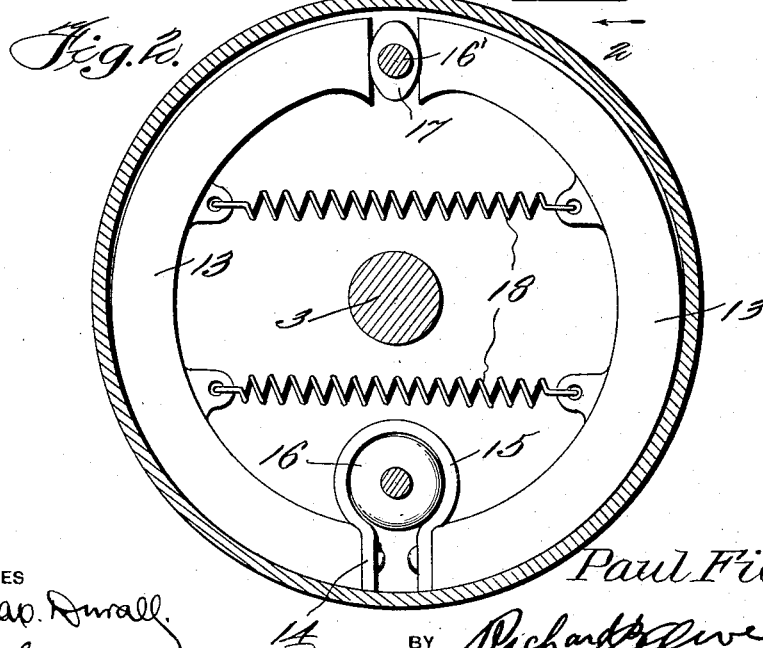
INVENTOR
Paul Fichter,
WITNESSES
BY
ATTORNEY

UNITED STATES PATENT OFFICE.

PAUL FICHTER, OF RANDOLPH, IOWA.

CLUTCH.

1,215,513.  Specification of Letters Patent.  Patented Feb. 13, 1917.

Application filed June 19, 1916. Serial No. 104,568.

*To all whom it may concern:*

Be it known that I, PAUL FICHTER, a citizen of the United States, residing at Randolph, in the county of Fremont and State of Iowa, have invented certain new and useful Improvements in Clutches, of which the following is a specification.

This invention relates generally to hay rakes, and particularly, to means for establishing a connection between the tine supporting bar or other movable part of the rake and the power wheel, whereby the said rake may be operated at the proper moment to throw or dump its contents by operation of the wheel.

The primary object of the invention is to provide means for use upon an implement of this character in substitution for the ordinary intermeshing gears, cams, chains and the like, whereby clogging of the mechanism with hay or straw will be prevented.

A further object of the invention is to provide a mechanism of this character which is of simple and inexpensive construction, which is composed of but few readily assembled parts, also constructed and arranged as to prevent wear, breakage, or dismemberment of the same, which is easily operated, which is positive in operation, and which will prove thoroughly efficient in the attainment of the ends for which it is designed.

With these objects in view, together with others which will appear as the description proceeds, the invention resides in the novel formation, combination, and arrangement of parts, all as will be described more fully hereinafter, illustrated in the drawings, and particularly pointed out in the claims.

The invention will be best understood by reference to the accompanying drawings, wherein:—

Figure 1 is a longitudinal sectional view taken through a portion of a conventional form of hay rake axle and wheel and illustrating the application of a device embodying my invention, and Fig. 2 is a transverse sectional view taken upon line 2—2 of Fig. 1.

Referring now more particularly to the drawing, 3 indicates a portion of the farm implement axle, upon which is rotatably mounted, a wheel, the hub of which is indicated at 4, and the spokes at 5.

The implement shown in the present illustration and in connection with which my invention is adapted particularly for use, is of that type wherein the wheels are mounted for rotation upon the axle, and wherein it is required at certain times to establish rotary movement in the axle in order that the latter may operate the rake or other movable parts of the mechanism. In order that this power connection may be positively effected, and in such manner as to prevent hay or straw becoming entangled in the power establishing elements, the latter are housed within sectional housing or casing members, one carried by the wheel and indicated at 6, and the other rigidly connected to the shaft or axle 3 and indicated at 7. These members are formed preferably of relatively thin durable metal plates of annular shape and of equal diameter, the wheel carried section 6 being secured to the spokes 5 by U-bolts 8, and the section 7 being arranged adjacent its coöperating section and having projecting centrally therefrom, a sleeve portion 9, through which retaining or set screws 10 are threaded to impinge the axle 3. Extending inwardly or toward each other from the peripheries of the members 6 and 7, are flanges 11 and 12, the outermost extremities of the said flanges lying together in such close proximity as to prevent the entrance of hay, straw or other foreign matter to the interior of the housing or drum portion formed by the two sections. If desired, these flanges may be arranged in overlapping relation.

The means for establishing a power connection between the wheel carried rotating section 6 and the section 7, secured to the axle or shaft 3, comprises a clutch member 13. This clutch member is made in sections, each section comprising an arcuate band formed of metal or other suitable rigid material, and the said bands being adapted when secured together at one end to lie concentric with and to extend around substantially the entire inner surfaces of the flanges 11 and 12 of the housing sections. The width of the arcuate members is such as to enable the same to contact the inner annular faces of the flanges 11 and 12, simultaneously, when the said band members are forced outwardly. These arcuate sections are connected together at one end by a spring member 14, the latter extending inwardly from the said band ends to provide a socket portion 15, within which a head 16 secured to the section 7 projects. The connection of the band ends by the spring member is such as to enable the said sections being moved outwardly or inwardly with the said spring member as a pivot. The opposite extremities of the arcuate sections 13 are spaced apart, and a rock shaft 16' projects through the wall of the shaft carried member 7 into said space. A cam 17 is secured on the rock shaft end between said arcuate member ends, and it is apparent that upon rocking movement being delivered to the shaft 16, the arcuate members will, through the cam 17, be forced outwardly and into engagement with the inner faces of the annular flanges 11 and 12. Springs 18 connect the band section 13 to normally force the same together and out of frictional engagement with the flanges 11 and 12, and when the cam 17 is disposed with its minor axis between the band ends, it is obvious that the contractile springs will exert inward pressure upon the band sections to break the frictional engagement between the said sections and the housing flanges. The rock shaft 16' may be extended to any desired position upon the implement to be conveniently operated to effect or break power connection between the casing sections.

By reason of the connection between the socket portions 15 of the spring member and the head 16 carried by the section 7, it is apparent that the band members will be carried by the section 7. When it is desired to operate that portion of the mechanism which is energized by rotation of the axle 3, the rock shaft 16 is rotated to force the bands 13 apart, whereby the frictional engagement of the said bands with the flanges 11 and 12 establishes a binding connection between the same, and the shaft or axle 3 and the mechanism dependant thereon is rotated, or operated.

It is thus seen that an extremely simple and yet thoroughly efficient means has been provided for attaining the desired ends. It is apparent that by arranging the sections 6 and 7 in the manner above described, a hollow drum is provided, within which the operable parts are located, and to which hay, straw or other foreign matter can not gain access.

While the above is a description of the preferred embodiment of the invention, it is apparent that various changes in the minor details of construction may be resorted to, if desired or found expedient without departing from the spirit of the invention or exceeding the scope of the claims.

What is claimed is:—

1. In a device of the class described, the combination with a pair of independently rotatable members, of housing sections carried by said members, a connector element within said housings and a cam for forcing said connector element into contact with said housing sections simultaneously, substantially as described.

2. In a device of the class described, the combination with a pair of independently rotatable members, of housing sections secured to said members, a connector element within said housings, and means for forcing said connector element into contact with said housings simultaneously, substantially as described.

3. In a device of the class described, a shaft, a rotatable member on said shaft, housing sections secured to said shaft and rotatable member respectively, arcuate band sections carried by one of said housing sections, a cam between the ends of said band sections and adapted to force said sections into engagement simultaneously with said housings, and an operating rod connected to said cam, substantially as described.

4. In a device of the class described, a shaft, a drum section fixed to said shaft, a rotatable member on said shaft, a drum section carried by said rotatable member and coöperating with said fixed section to form a drum, arcuate band sections hinged together at one end within said drum and carried by the fixed section thereof, springs normally holding said band sections disengaged from the annular walls of said drum, the free ends of said band sections being spaced apart, a cam interposed between said spaced ends, and a shaft for rotating said cam, substantially as described.

In testimony whereof I affix my signature in presence of two witnesses.

PAUL FICHTER.

Witnesses:
 H. J. FICHTER,
 GERTRUDE GILCHRIST.

Copies of this patent may be obtained for five cents each, by addressing the "Commissioner of Patents, Washington, D. C."